United States Patent [19]
Riseberg et al.

[11] 3,908,121
[45] Sept. 23, 1975

[54] INTEGRATED OPTICAL FREQUENCY-DIVISION MULTIPLEXER

[75] Inventors: Leslie A. Riseberg, Sudbury; Harold Samelson; Alexander Lempicki, both of Wayland, all of Mass.

[73] Assignee: GTE Laboratories Incorporated, Waltham, Mass.

[22] Filed: Nov. 20, 1974

[21] Appl. No.: 525,417

Related U.S. Application Data

[63] Continuation-in-part of Ser. No. 417,024, Nov. 19, 1973, abandoned.

[52] U.S. Cl. ........... 250/199; 179/15 FD; 332/7.51; 350/96 WG; 350/169
[51] Int. Cl.² ............................................. H04B 9/00
[58] Field of Search ............... 250/199; 179/15 FD; 331/94.5 C, 94.5 L; 350/96 WG, 169; 332/7.51

[56] References Cited
UNITED STATES PATENTS
3,589,794  6/1971  Mercatilli............................ 350/96
3,676,684  7/1972  De Lange........................... 250/199

*Primary Examiner*—Robert L. Griffin
*Assistant Examiner*—Marc E. Bookbinder
*Attorney, Agent, or Firm*—Irving M. Kriegsman; Bernard L. Sweeney

[57] ABSTRACT

An integrated optical frequency-division multiplexer is described wherein a plurality of laser elements are disposed in a parallel arrangement and are tuned individually to a distinct optical wavelength within the lasing bandwidth of the laser elements. The laser elements are formed of a material exhibiting a wide potential lasing bandwidth and may be pumped from a common laser source. A preferred embodiment of frequency-division multiplexer is formed as a single integrated optical device which also includes an optical pumping waveguide, which couples the pumping source to the individual laser elements, as well as individual optical modulators and an optical waveguide in which the modulated outputs from the individual laser elements are combined.

10 Claims, 1 Drawing Figure

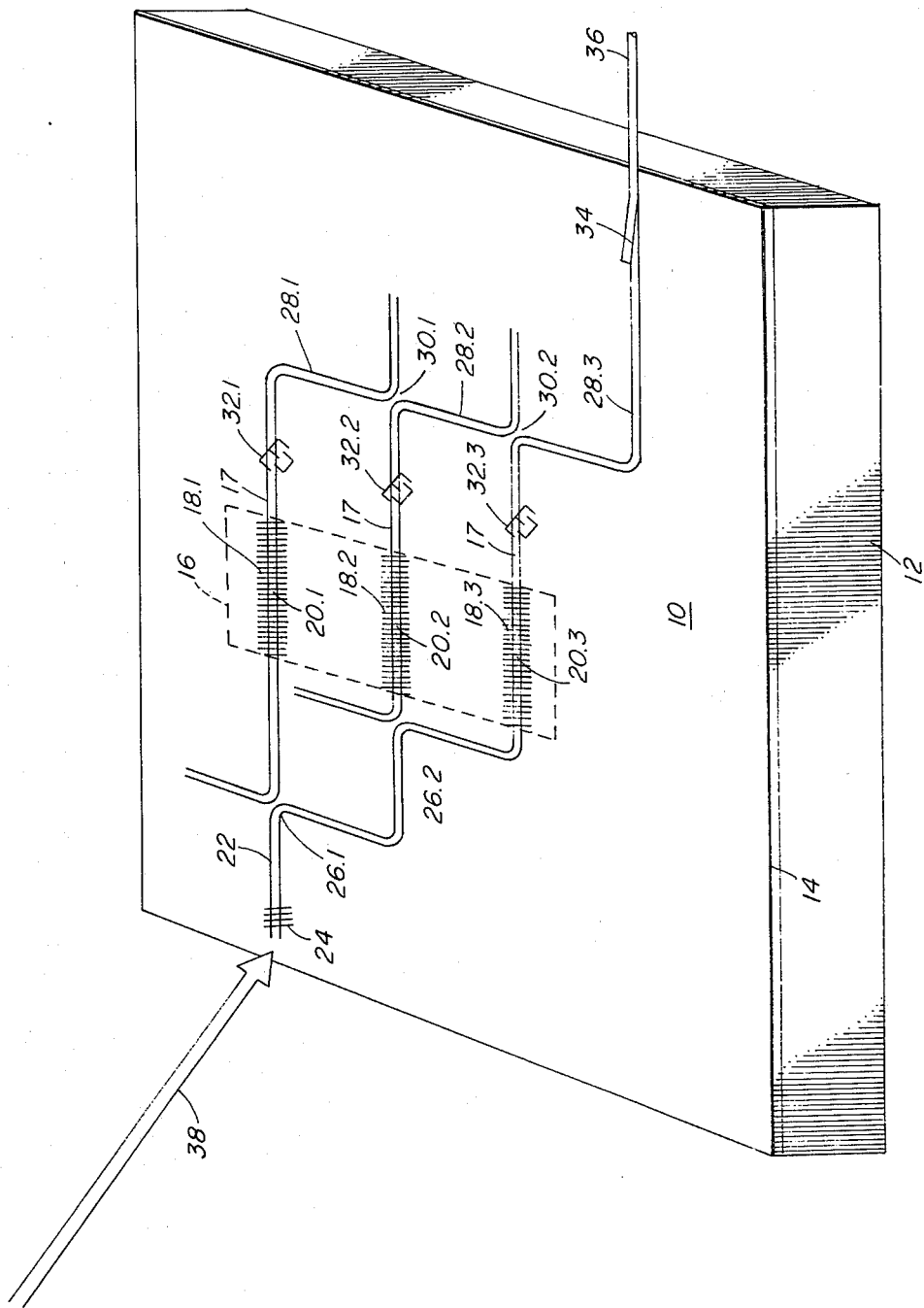

INTEGRATED OPTICAL FREQUENCY-DIVISION MULTIPLEXER

CROSS-REFERENCE TO A RELATED APPLICATION

This application is a continuation-in-part of our earlier-filed copending application, Ser. No. 417,024, filed Nov. 19, 1973 now abandoned.

FIELD OF THE INVENTION

This invention relates to the field of integrated optics. More specifically, this invention relates to an optical device which frequency-division multiplexes a large number of optical signals for use in an optical transmission system.

BACKGROUND OF THE INVENTION

A recent development in the field of optical communications with lasers involves the generation of so-called integrated optical circuits. Various descriptions of components and devices have appeared in the liturature such as in the Special Issue on Optical Communication of October 1970, in *Proceedings of the IEEE*. A particular article of general interest is "Integrated Optics: An Introduction" by Stewart E. Miller published in *The Bell System Technical Journal* of September 1969, at page 2059.

Integrated optical devices are oriented towards the miniaturization of the functions of conventional beam-mode operating devices whose bulky shapes do not lend themselves readily to miniaturization. One medium for transmission of the optical information generated in such integrated optical devices involves optical fibers whose small cross-sections are compatible for coupling to an integrated optical circuit. A single such optical fiber can carry an enormous amount of information provided the optical energy it transmits can be properly multiplexed and modulated.

Several materials and devices have been described to generate optical signals for circuits with modulating devices and couplers or the like to provide input and output coupling. One such device is known as a dye laser and may be formed, for example, by doping a bulk material such as poly(methyl methacrylate) with a dye known as rhodamine 6G. Such a device is described with greater particularity in an article entitled "Poly(-Methyl Methacrylate) Dye Laser With Internal Diffraction Grating Resonator," by Kaminow, Weber and Chandross, published on June 1, 1971, at page 497 in *Applied Physics Letters*, Vol. 18, No. 11.

As shown and described in the Kaminow et al. article, the dye laser may be pumped with a suitable laser source whose energy is at a wavelength within the absorption band of the dye thereby exciting it and causing it to lase. This dye laser has been shown to be capable of lasing over a broad band of wavelengths measured in hundreds of angstroms and specifically over a range extending from 5520A to 5750A.

SUMMARY OF THE INVENTION

It is, therefore, an object of the present invention to provide an integrated optical frequency-division multiplexer.

It is a second object of the invention to provide such a multiplexer which incorporates a broad band laser dye.

It is a further object of the invention to provide such as multiplexer which further includes means for individually modulating each of a plurality of distinct output wavelengths.

Briefly, the invention in its broadest aspect is an integrated optical frequency-division multiplexer for generating a plurality of individual optical signals at a like plurality of distinct wavelengths. A substrate is formed from a first rigid dielectric material having a first index of refraction and has a planar surface thereon. A plurality of longitudinally extended optical waveguide paths are disposed on the planar surface of the substrate. The optical waveguide paths are formed of a thin layer of a second dielectric material having a second index of refraction which is greater than the first index of refraction. At least a portion of the length of each optical waveguide path has a dye uniformly dispersed therein. The dye is one which is capable of emitting stimulated radiation over a wide spectrum of optical wavelengths. Means are provided for defining a resonator in that portion of each optical waveguide path wherein the dye is uniformly dispersed. Each resonator resonates and provides an output at a particular wavelength within the wide spectrum, each of the plurality of wavelengths being different. A means pumps the dye within each of the resonators with energy from a suitable pumping source to excite the dye molecules above their threshold emission level. Means are provided for individually modulating each of the plurality of outputs. Finally, means are provided for combining the plurality of outputs to form a frequency-division multiplexed, individually modulated output signal.

These and other objects, advantages and features of the invention will be understood from the following detailed description of a preferred embodiment described in conjunction with the associated drawing.

BRIEF DESCRIPTION OF THE DRAWING

In the Drawing; the sole FIGURE is a partially schematic isometric representation of an integrated optical circuit for producing a frequency-division multiplexed, modulated wave according to the invention.

DETAILED DESCRIPTION OF A PREFERRED EMBODIMENT

With reference to the Drawing, an integrated optical circuit identified generally by the reference numeral 10 is shown and is formed of a suitable substrate 12 on which an optical medium 14 is deposited. The substrate 12 is an inorganic or organic dielectric material having a physical strength sufficient to support an integrated optical circuit. The medium 14 is formed of a material which is physically compatible with the substrate 12, has a refractive index at wavelengths at which the device 10 is desired to be operable which is or may be altered to be greater than the refractive index of the substrate, and which is essentially transparent at those wavelengths of operation. The medium 14 may be any material in which a suitable broad spectrum laser dye may be dispersed. For example, the following polymers are suitable: poly(vinyl chloride), poly(vinylidene chloride), poly(acrylonitrile), poly(styrene), and poly(methyl methacrylate). In the presently preferred embodiment, the medium 14 is formed of poly(methyl methacrylate) and a dye known as rhodamine 6G is dispersed throughout a lasing region 16 therein.

The optical medium 14 has a plurality of functionally parallel optical waveguide paths 17 passing through the lasing region 16. These optical paths may be formed by irradiating the the poly(methyl methacrylate) of the preferred embodiment through a mask with ultraviolet light which alters the refractive index. Alternatively, the waveguide paths 17 may be formed by conventional techniques using photoresist and etching so that the dye is found only within the waveguide paths 17.

Each of the waveguide paths 17 is further provided within the lasing region 16 with a resonator 18 by creating long continuous Lippman-Bragg phase grating holograms extending throughout the length of the lasing region 16 in each waveguide path 17. Such gratings may be formed by interfering two beams of monochromatic light of the same wavelength. The angles of incidence determine the grating spacings. These long gratings provide distributive feedback for an optical wave whose wavelength is determined by the character or spacings of the gratings. Therefore, precise wavelength control can be established so that the respective laser elements 20 each lase at a different wavelength within the spectrum of wavelengths associated with the dye. The wavelength spacing of the outputs from the laser elements 20 is a matter of choice and may be determined by the ability of the demultiplexing apparatus to discriminate between adjacent wavelengths.

Alternatively, the resonators 18 may be formed by establishing a pair of separate reflective elements along each optical waveguide path 17. The reflective element at the output is to be somewhat less than totally reflective at the wavelength of emission for the individual laser element 20 formed therein whereas the other reflective element is totally reflective at the wavelength. The reflective elements have at least a portion of the dye-containing region therebetween. These elements may be formed by applying a photoresist to the upper surface or by the technique suggested above for the distributed feedback form of resonators. Once again, the spacing of the lines in the reflective elements defines the particular frequency of operation for the individual laser elements 20.

The pumping of the laser elements 20 may be accomplished by a variety of techniques. One such technique has a optical pumping waveguide 22 as shown extending from an input grating coupler 24 to each of the laser elements 20. The waveguide 22 is optically coupled to the laser elements 20 by a series of couplers 26. The optical waveguide 22 and the couplers 24 and 26 may be formed in the manner described above for the waveguides 17 and/or resonators 18. The couplers 26 operate by coupling a portion of the energy in the waveguide 22 into the waveguide paths 17 by selective coupling of evanescent wave energy as shown in U.S. Pat. No. 3,589,794 by Marcatili, the subject matter of which is incorporated herein by reference. A similarly formed output optical waveguide 28 is shown extending from each lasing element 20 and coupled together by a second series of couplers 30. A tapered coupler 34 or other suitable coupling means is provided to couple the modulated and combined optical energy to an optical fiber 36 for transmission.

An individual electro-optical modulator 32 is emplaced in each output waveguide 28. The modulator may be of any desired form, such as those described in the aforementioned Marcatili patent. A preferred form of the modulator is one in which a pair of interdigital metallic film electrodes are deposited on the surface of the medium 14 over an individual waveguide path 17. The digits of the respective electrodes cross the waveguide path 17 at the Bragg angle. When a voltage is applied across the electrodes, a corresponding change in the electric field is caused such that a grating diffractor is formed. Control of the voltage applied determines the portion of the light generated in the laser element 20 which is allowed to pass.

A beam 38 of suitable optical pumping power is shown directed at the input grating coupler 24 to produce the excited energy state in the dye molecules of the laser elements 20. The pumping power may be derived from a laser source such as the frequency-doubled Nd:YAG laser. A frequency-doubled neodymium laser operates at a wavelength of approximately 5300A which is near the peak of the absorption band of the rhodamine 6G dye. An argon gas laser could also be used as a pumping source.

The power in laser beam 38 can be mode-locked to yield light at a wavelength of 5320A in the form of pulses of 20 picoseconds duration, with a repetition rate for such pulses of about 1 GHz or more, depending upon the round-trip transit time $[2L/c]$ in the cavity of the mode-locked Nd:YAG laser.

When such a beam is focused, a power density of the order of $10MW/cm^2$ may be achieved. This is three orders of magnitude above the threshold pumping power density $(0.01\ MW/cm^2)$ needed to cause the rhodamine 6G dye laser elements 20 to lase. Hence, the input laser pump pulse 38, after coupling into pumping waveguide 22, is split by couplers 26 into many pump waves for the respective dye laser elements 20.

In the embodiment shown in the Drawing, only three laser elements 20 are shown for clarity. It should be understood, however, that a larger number of laser elements 20 may be simultaneously pumped. The total number of such elements possible varies depending upon the pumping efficiencies and power losses encountered in coupling the input pumping beam 38 to the laser elements 20, the spectral separation, and particular design requirements.

The dye laser elements 20 may be made extremely short, for example, about 150 micrometers, because of the high net gain per unit length of the rhodamine 6G dye. In such case, the round-trip transit time in the dye laser element 20 is approximately 1 psec., thus permitting about 20 passes during a 20 psec. pumping pulse 38. Each surface dye laser element 20 thus may produce a train of pulses at the rate of the pump, i.e., about 1 GHz, as a separate channel at a different wavelength. A mode-locked laser pump 38 thus serves as a fundamental clock for the modulation of each separate information carrying laser element 20.

In view of the dispersive effects of the various different wavelengths in the channels, care is taken to maintain signal synchronization. In one mode of operation, the pump source 38 is transmitted along with the other lasing pulses to provide a source of clock pulses to synchronize, for example, the operation of a succeeding repeater station.

The pump laser at a repeater station is made synchronous with the fundamental clock, thus providing a source of pulses for further transmission. The modulators 32 are also synchronized to the clock pulses. Each input channel is detected independently and the presence or absence of a pulse, signifying a digital 1 or 0, is used to turn the modulator on or off the next available pulse from the repeater laser corresponding to that channel. Thus, although dispersion in transmission between repeaters may introduce delays of many periods between channels, there is no need for an equalizer because each channel operates essentially independently.

While the preferred embodiment of the present invention has been described in the form of a rhodamine 6G dye laser, it is intended that any other similar laser dye which is capable of emitting over a broad spectrum may be substituted therefor.

When the combined optical wave in an optical fiber such as 36 is to be demultiplexed subsequently, a plurality of resonant directional couplers as described in the previously identified Marcatili patent may be used.

In another arrangement of the invention, either monochromatic or broad spectrum pumping light may be imposed on the integrated optical device normal to the exposed planar surface. In this arrangement, the input couplers and waveguides can be eliminated.

While there has thus been shown and described what is considered to be a preferred embodiment of an optical frequency-division multiplexer in accordance with the invention, it will be obvious to those of ordinary skill in the art that various changes and modifications may be made therein. For example, a plurality of information carrying, separated wavelength channels may be produced with a substantial economic advantage in the cost per unit bandwidth. These changes may be made without departing from the invention as defined in the appended claims.

We claim:

1. An integrated optical frequency-division multiplexer for generating a plurality of individual optical signals at a like plurality of distinct wavelengths comprising
    a substrate which is formed from a first rigid dielectric material having a first index of refraction and which has a planar surface thereon,
    a plurality of longitudinally extended optical waveguide paths being disposed on the planar surface of the substrate, the optical waveguide paths being formed of a thin layer of a second dielectric material having a second index of refraction which is greater than the first index of refraction, at least a portion of the length of each optical waveguide path having a dye dispersed uniformly therein which dye is capable of emitting stimulated radiation over a wide spectrum of optical wavelengths,
    means for defining a resonator in that portion of each optical waveguide path wherein the dye is dispersed uniformly, the resonator being resonant and providing an output at a particular wavelength within the wide spectrum, each of the plurality of particular wavelengths being different,
    means for pumping the dye within each of the resonators with suitable energy to excite the dye molecules above their threshold emission level,
    means for individually modulating each of the plurality of outputs, and
    means for combining the plurality of outputs to form a frequency-division multiplexed, individually modulated output signal.

2. An integrated optical frequency-division multiplexer according to claim 1, wherein the optical waveguide paths are formed of a dye impregnated in a solid organic medium.

3. An integrated optical frequency-division multiplexer according to claim 2, wherein the dye is rhodamine 6G.

4. An integrated optical frequency-division multiplexer according to claim 2, wherein the reflective elements of the resonators are Lippman-Bragg holograms formed in the optical waveguide paths.

5. An integrated optical frequency-division multiplexer according to claim 4, wherein the reflective elements in the resonators are long continuous Lippman-Bragg holograms providing distributive feedback for an optical wave.

6. An integrated optical frequency-division multiplexer according to claim 2, wherein the optical waveguide paths are defined in a thin layer of the solid organic medium.

7. An integrated optical frequency-division multiplexer according to claim 6, wherein the solid organic medium is selected from the group consisting of poly(vinyl chloride), poly(vinylidene chloride), poly(acrylonitrile), poly(styrene), and poly (methyl methacrylate).

8. An integrated optical frequency-division multiplexer according to claim 7, wherein the solid organic medium is poly(methyl methacrylate).

9. An integrated optical frequency-division multiplexer according to claim 1, wherein said pumping means comprises
    an input optical pumping waveguide path being formed of a third dielectric material which is transparent to said suitable energy,
    an input coupler for coupling said suitable energy into the input optical pumping waveguide path, and
    means for coupling the energy from the input optical pumping waveguide path into the plurality of longitudinally extended optical waveguide paths so that the dye in the resonators is pumped longitudinally.

10. An integrated optical frequency-division multiplexer according to claim 9, wherein the suitable energy is an output laser pulse of a frequency within the absorption band of the dye from a mode-locked laser.

* * * * *